Apr. 17, 1923.
E. P. ARMSTRONG ET AL
1,452,351
AUTOMATIC SAW SHARPENING MACHINE
Filed Jan. 8, 1919    10 sheets-sheet 6
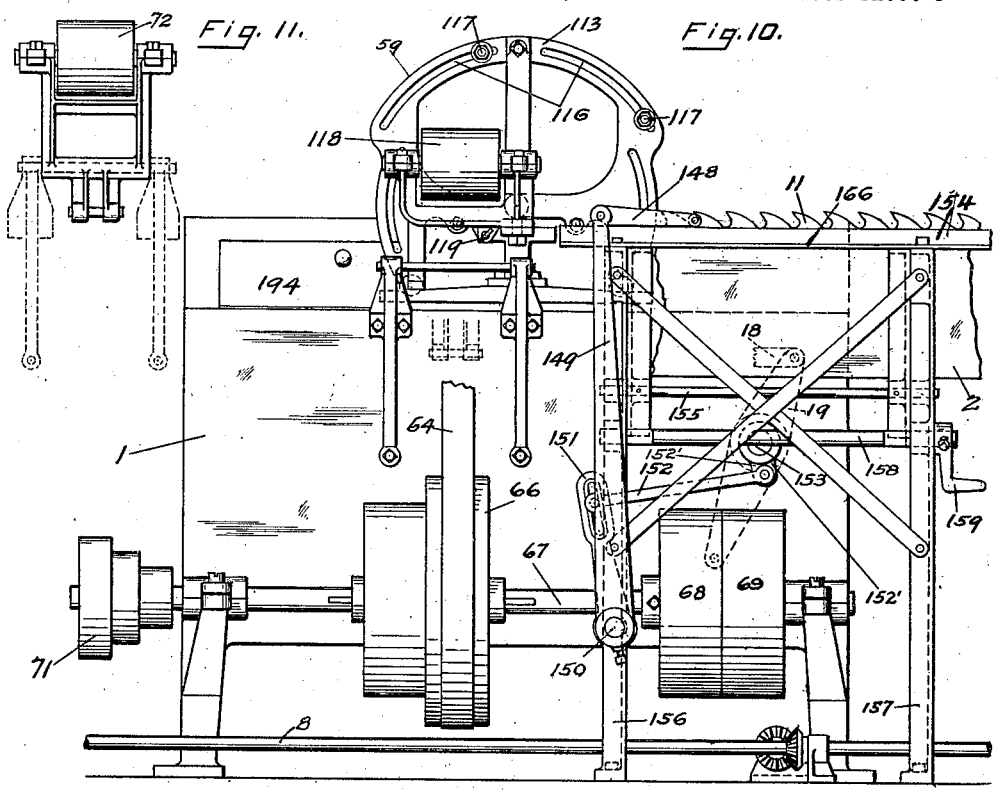
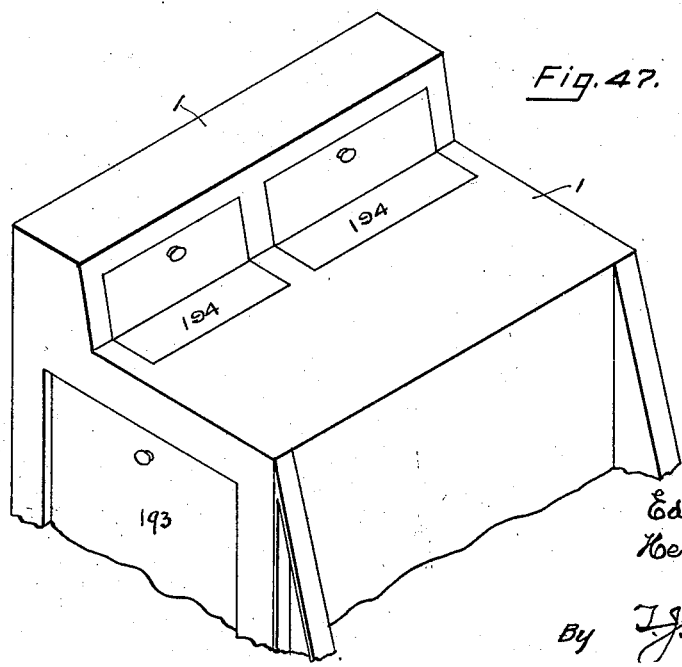
Edward P. Armstrong
Henry W. Armstrong
Inventors
By T. J. Geisler
Atty.

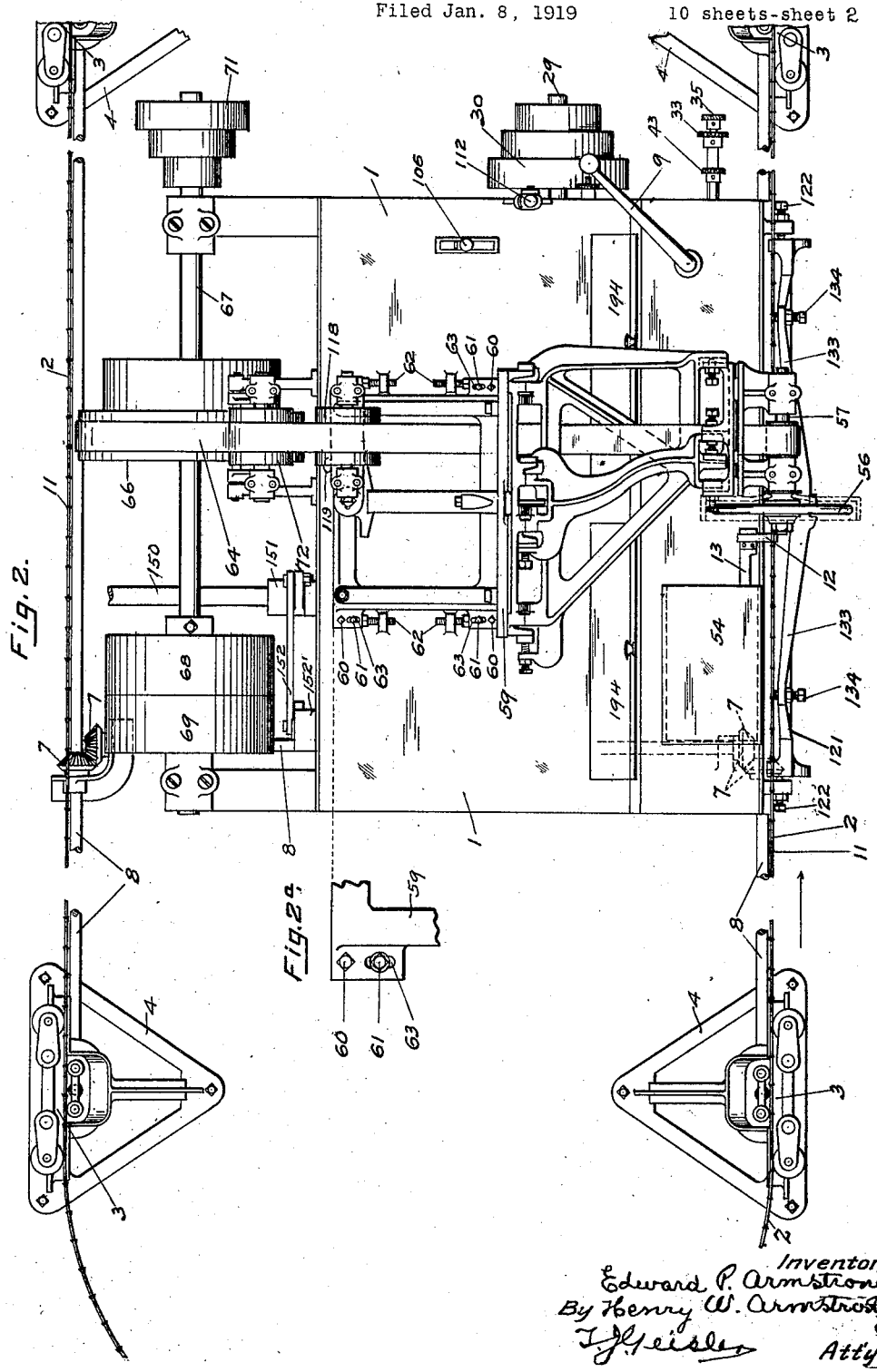

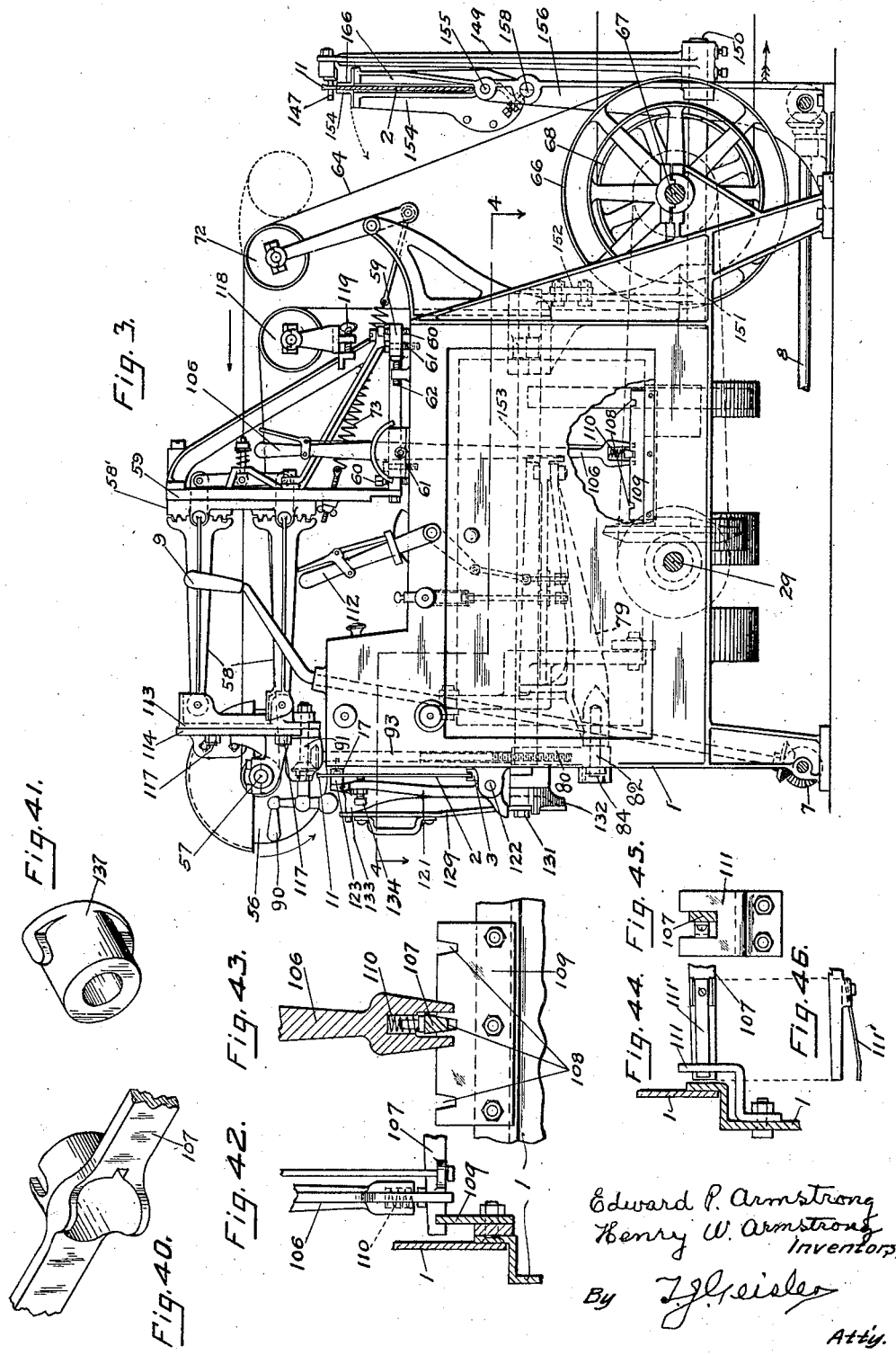

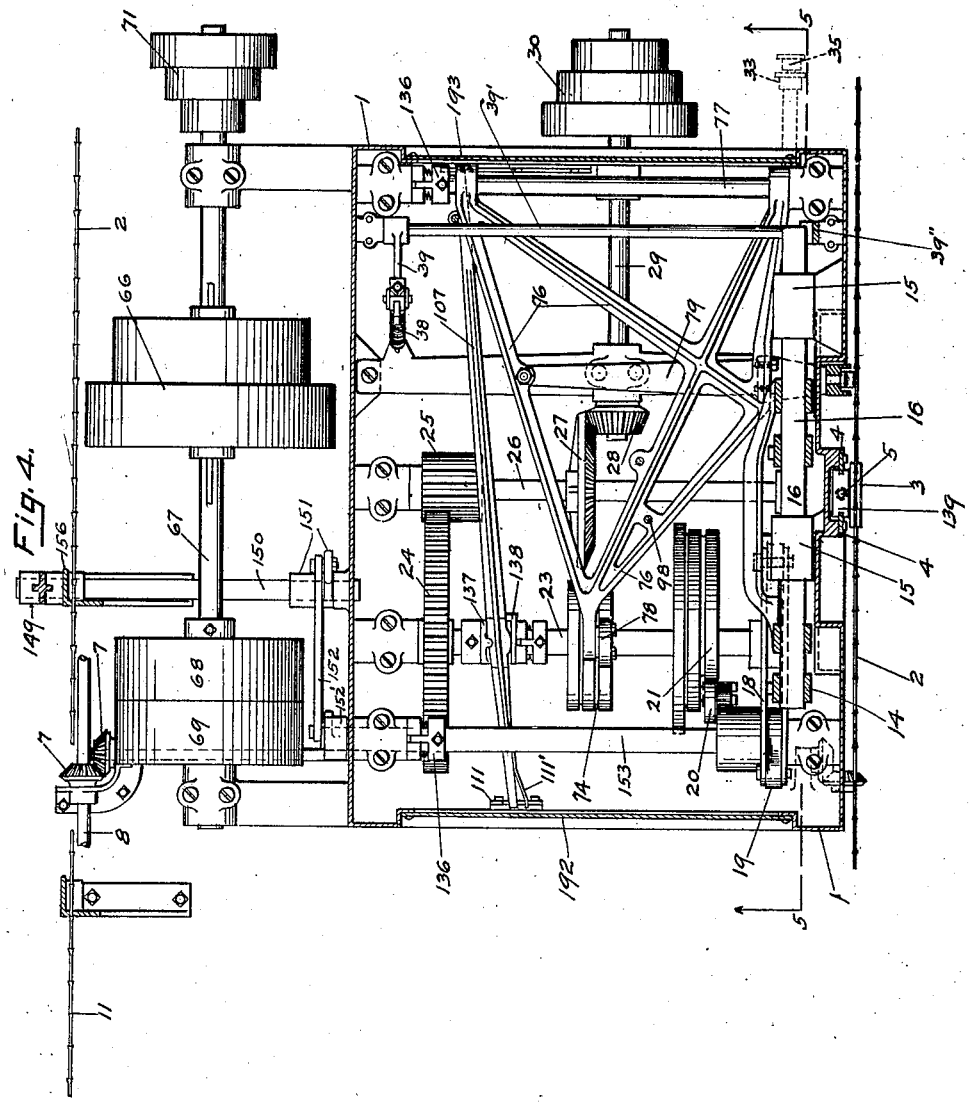

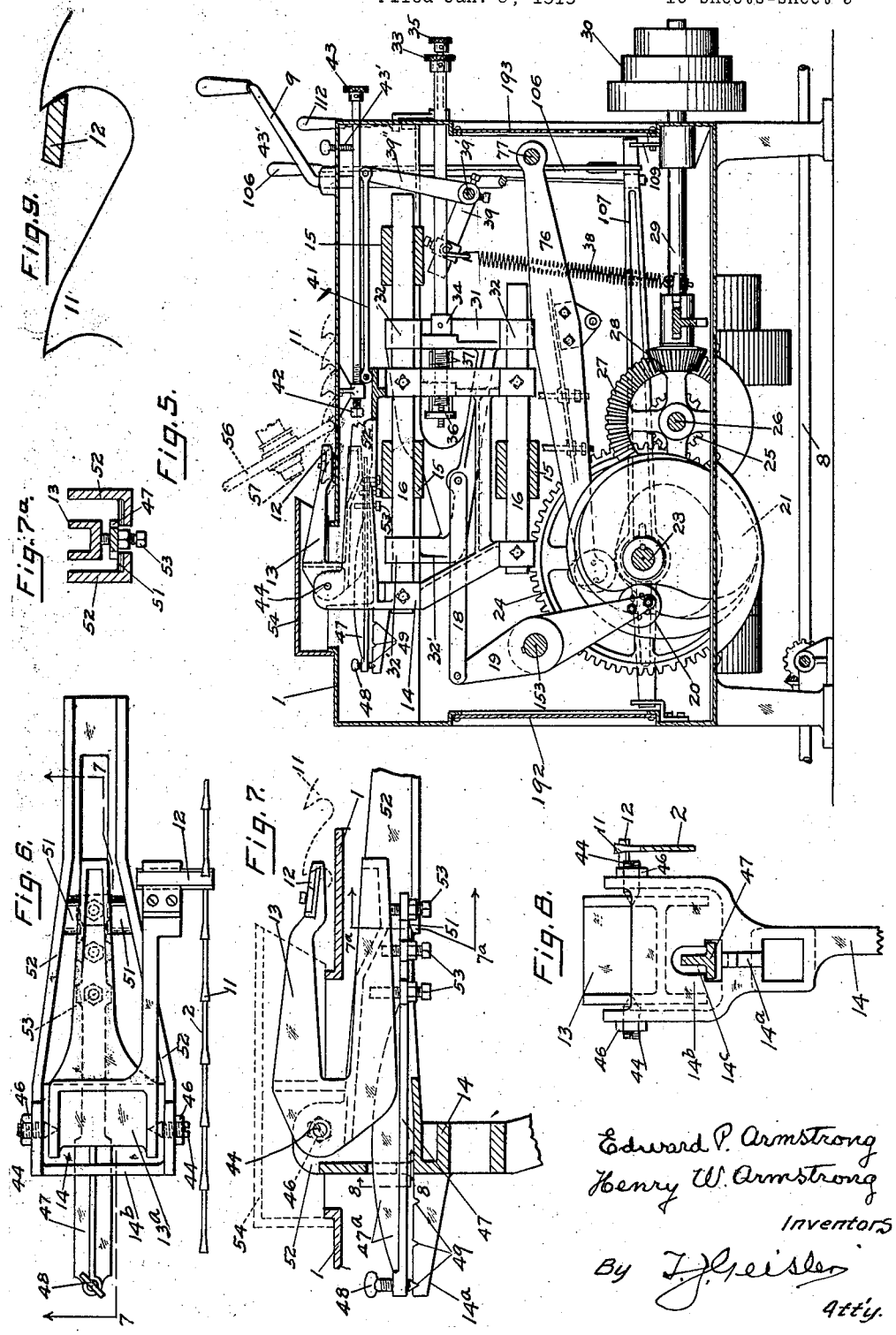

Apr. 17, 1923. 1,452,351
E. P. ARMSTRONG ET AL
AUTOMATIC SAW SHARPENING MACHINE
Filed Jan. 8, 1919 10 sheets-sheet 7
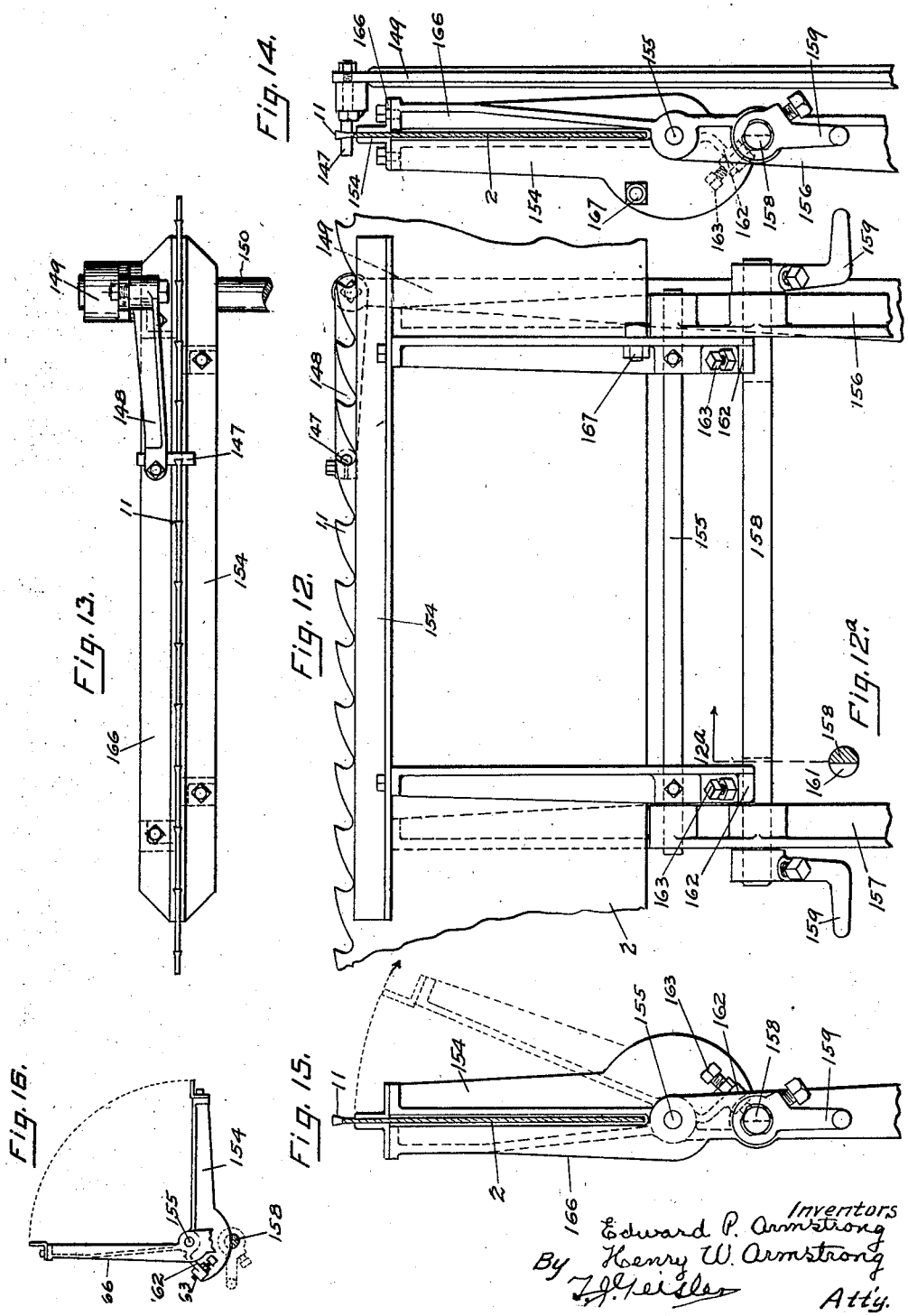

Apr. 17, 1923.
E. P. ARMSTRONG ET AL
1,452,351
AUTOMATIC SAW SHARPENING MACHINE
Filed Jan. 8, 1919    10 sheets-sheet 8
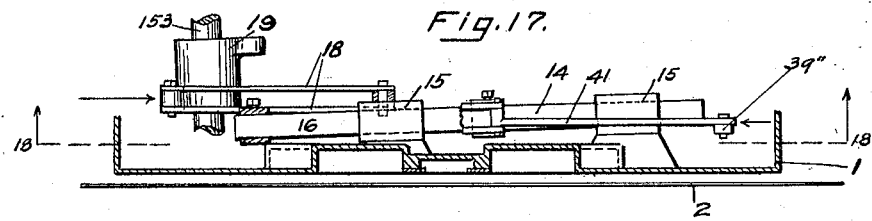
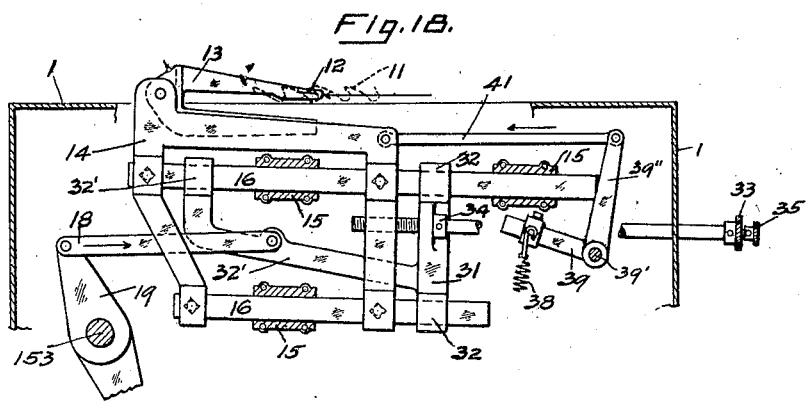
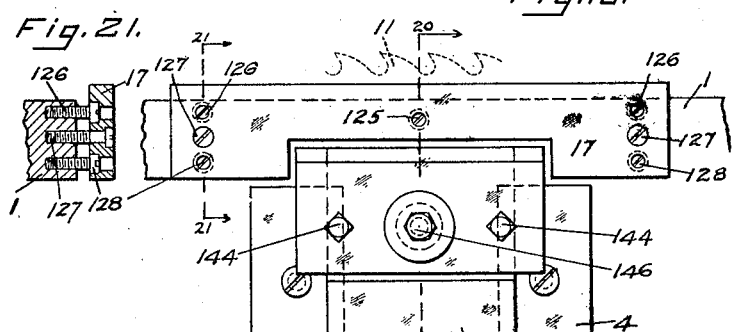
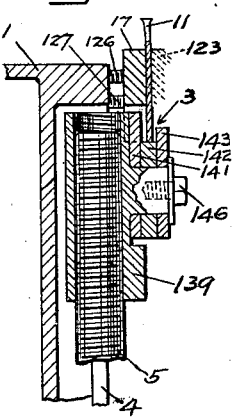
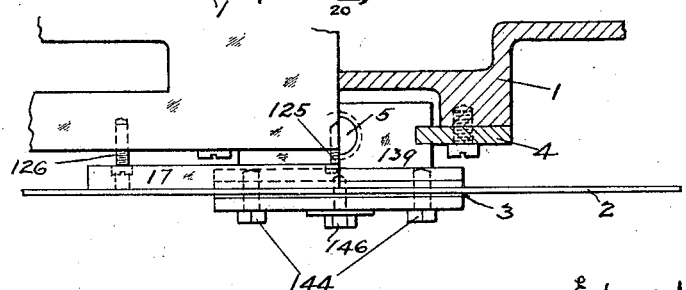
Inventors
Edward P. Armstrong
By Henry W. Armstrong
Atty.

Apr. 17, 1923.
E. P. ARMSTRONG ET AL
1,452,351
AUTOMATIC SAW SHARPENING MACHINE
Filed Jan. 8, 1919   10 sheets-sheet 9
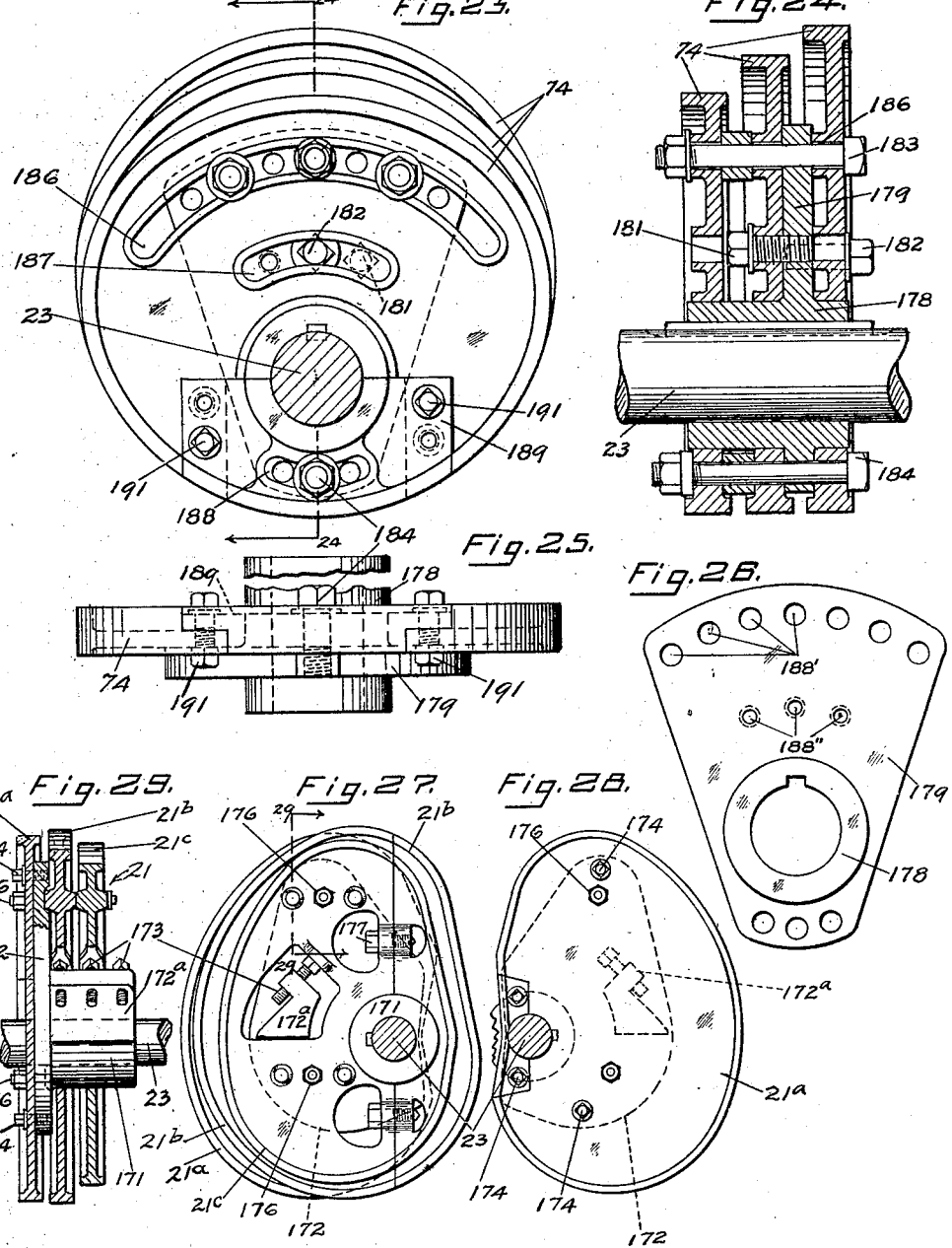
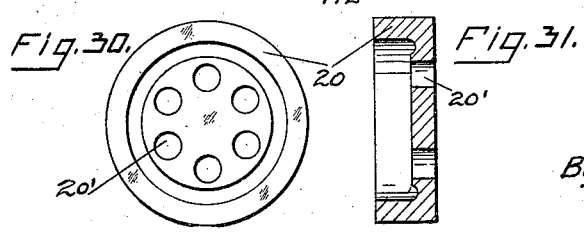

Apr. 17, 1923. 1,452,351
E. P. ARMSTRONG ET AL
AUTOMATIC SAW SHARPENING MACHINE
Filed Jan. 8, 1919 10 sheets-sheet 10
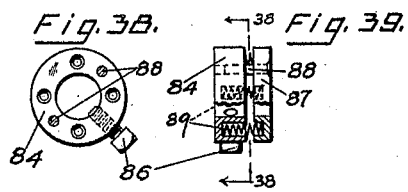
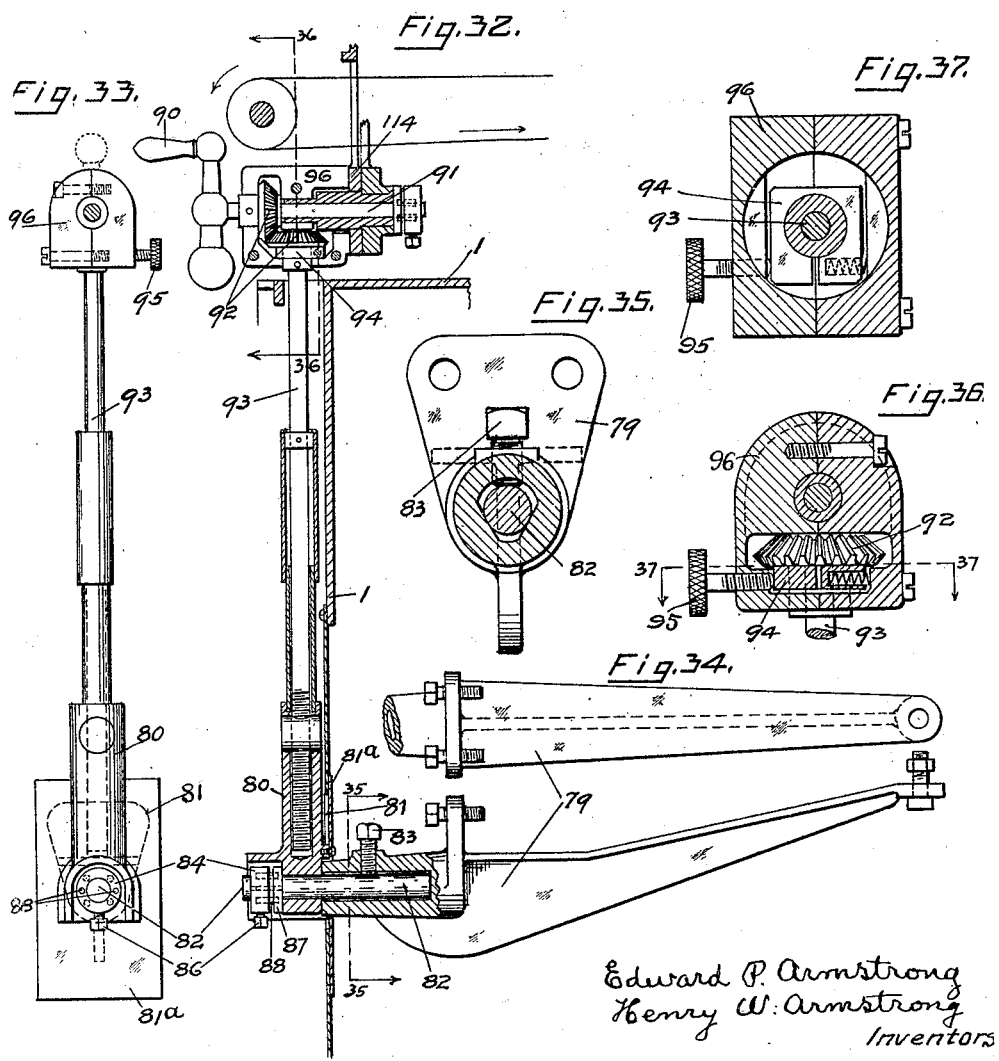
Edward P. Armstrong
Henry W. Armstrong
Inventors
By F. J. Geisler
Atty.

Patented Apr. 17, 1923.

1,452,351

UNITED STATES PATENT OFFICE.

EDWARD P. ARMSTRONG AND HENRY W. ARMSTRONG, OF PORTLAND, OREGON.

AUTOMATIC SAW-SHARPENING MACHINE.

Application filed January 8, 1919. Serial No. 270,209.

*To all whom it may concern:*

Be it known that we, EDWARD P. ARMSTRONG and HENRY W. ARMSTRONG, citizens of the United States, and residents, respectively, of Portland, Multnomah County, State of Oregon, have invented a certain new and useful Improvement in Automatic Saw-Sharpening Machines, of which the following is a specification.

Our invention relates to automatic saw sharpening machines designed for both sharpening and shaping the teeth.

The object of our invention is to design a dependable machine which will not only give the same results as hand filing, but give superior results.

We attain our object in a machine which embodies among others the following features: The saw-back-rests are operatively connected, so that they may be simultaneously raised or lowered in unison with each other, thereby assuring that the saw will be level. This is essential to produce good work. If the back rests are not so constructed but require independent adjustment, it quite frequently happens that the operator will not stop his work to make these adjustments, where he thinks the difference is negligible, and the result is variation in shape of the saw teeth and inaccuracy in the subsequent operations upon the saw.

Furthermore, we have so constructed our machine as to keep the joints of the operating parts in elastic compression, thereby eliminating lost motion and inaccuracy in the work of the machine. We further assure accuracy by providing a force-coupling tending to give the moving parts a constant bearing against the same faces of their guide elements. Furthermore, the feed-finger moves forward down an inclined path in order to avoid any tendency of the same lifting the saw off its support, which would tend to introduce inaccuracy in the work of the saw. The feed-finger exerts a pull on the saw against one face of the guide elements, thereby holding the saw against lateral deflection. In other words, a two-fold purpose is accomplished: (first) the keeping of the saw firmly seated in the back-rest regardless of the wear which is bound to occur in the latter; (second) the holding of the saw firmly against the guide blocks, so that it will not vibrate under the tangential force of the emery wheel during the grinding operation of the latter.

Our invention also embodies means for varying the travel of the saw, and, co-operatively therewith, varying the vertical stroke of the emery wheel, whereby our machine is adapted for operating on different types and different spacings of saw teeth. This result is attained by providing our machine with two series of changeable cams, which operate the saw-advancing means and the saw teeth grinding mechanism in variable, relative unison. The advantage of having the machine adjustable in the particulars just referred to is obvious to anyone conversant with the art. For instance, band sawing machines are frequently used for cutting both hard and soft wood logs, being used perhaps for a few days in cutting soft-wood logs, and then alternated with hard-wood logs for a few days. The spacing of the saw-teeth best adapted for cutting soft-wood logs is not, however, suitable to cut hard-wood logs to the best advantage. And teeth-spacing adapted to cut small logs, saw 12 inches in diameter, is not suitable for cutting large logs of 4 feet and over in diameter. Therefore many mills require really two kinds of saws, one set of saws with fine teeth and another with coarse teeth. But since the saw sharpening machines as heretofore constructed were not adapted to grind more than one type of teeth without being readjusted, mill operators frequently confined themselves to the use of one size saw-tooth for all kinds of logs, working at a great disadvantage by so doing, but having no alternative except to install two sharpening machines, which is often impossible for want of room in the building, and causes, besides, considerable additional expense.

Another instance of the utility of our machine, in being adapted to operate upon saws having different spacings of teeth, is the following: Some saw mills operating a main band saw machine for sawing logs use for such work saws having teeth of perhaps 2½ inches spacing, and the mill would also have a small band rip or resaw machine having teeth perhaps with less than 1 inch spacing. The small saw would only require sharpening once or twice a week, while the other band saw would require sharpening several times a day. Our machine is adjustable for operating on either of said saws, and all that is required for the adjustment is the movement of the lever controlling the means co-operatively actuating the saw advancing means and the grinding mechanism of our machine, as hereinafter described. The saw-advancing mechanism is further adjustable so as to adapt our machine for saw-teeth of different heights.

Furthermore, in our invention the bracket supporting the emery wheel is adapted to be adjusted horizontally and vertically so that the wheel can be given proper placement over the saw.

Our machine is furthermore adjustable so as to sharpen only the points of saw teeth when it is so desired. This result is attained by providing an adjustable stop in the machine operating to limit the entry of the emery wheel into the throat of the saw teeth.

Another important improvement in our machine is the construction of the back-rests, or saw supports, which are so designed as to permit their being demounted and re-surfaced when a groove has been worn therein in service, for such a groove, if deep enough, will bind the saw and prevent its proper forward motion under the emery wheel, and thereby introduce inaccuracies.

All the above specified and incidental features of our machine are hereinafter fully described and illustrated in the accompanying drawings, in which:

Fig. 2 (Sheet 2) is a plan or top view corresponding with Fig. 1;

Figure 1:
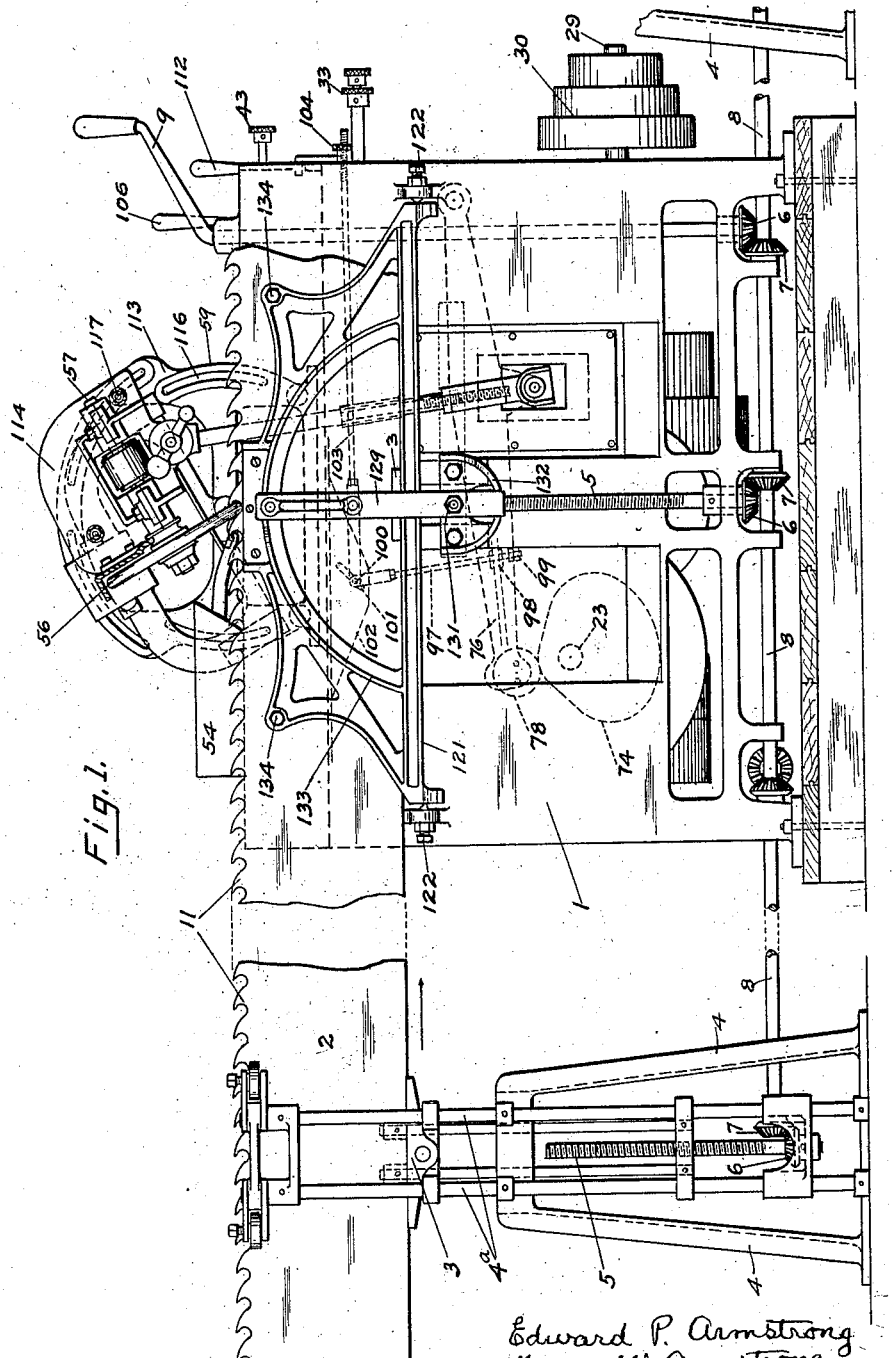
Fig. 1 (Sheet 1) is a front elevation of our machine in its entirety, showing the same in operative position.

Fig. 2ᵃ is a fragmentary view showing a detail of construction.

Fig. 3 (Sheet 3) is a right-end elevation of our machine with respect to its position in Figs. 1 and 2; in Figs. 2 and 3, however, the grinding wheel and frame supporting the same are shown in perpendicular position for convenience, while in practice the grinding wheel and its supporting frame would ordinarily be inclined as shown in Figs. 1 and 5; Fig. 3 also includes a back feeding attachment adapted to give positive movement to the saw feeding in co-operation with the saw-feeding mechanism on the front side of the machine;

Fig. 4 (Sheet 4) is a plan section taken on line 4—4 of Fig. 3, except that the saw is shown in full in Fig. 4;

Fig. 5 (Sheet 5) is a vertical section taken on a line 5—5 of Fig. 4;

Fig. 6 (Sheet 5) is a plan view of the feed finger;

Fig. 7 (Sheet 5) is a sectional detail of the feed finger taken on line 7—7 of Fig. 6 and illustrates the mode in which said feed finger is supported and adjusted to suit the type of saw being sharpened; Fig. 7ᵃ is a section approximately taken on the line 7ᵃ of Fig. 7;

Fig. 8 (Sheet 5) is a section of the feed finger taken on line 8—8 of Fig. 7;

Fig. 9 (Sheet 5) is a diagrammatic illustration of the co-operative action between the feed finger and the saw tooth;

Fig. 10 (Sheet 6) is a partial rear elevation of our machine showing particularly the operation of the back feed and also the mounting of the pulley carrying the the belt of the emery wheel;

Fig. 11 (Sheet 6) is a detail of a rear tightener pulley omitted from Fig. 10 but shown in Fig. 3;

Figs. 12, 12ᵃ, 13, 14, 15 and 16 (Sheet 7) are details relating to the construction of the auxiliary saw-feed finger and back-rest in the rear of our machine;

Figs. 17 and 18 (Sheet 8) are details of the feed finger operating mechanism;

Figs. 19 and 20 (Sheet 8) are details of the back-rest for the saw, showing the back-rest at its highest position;

Fig. 21 (Sheet 8) is a section of the adjustable face plate on line 20—20 of Fig. 19;

Fig. 22 (Sheet 8) is also a detail of the back-rest for the saw;

Figs. 23 to 29 inclusive (Sheet 9) are details of the demountable cams which give the feed finger and emery wheel their desired co-operative motion; Fig. 25 illustrates a two-piece cam so designed as to facilitate its removal;

Figs. 30 and 31 (Sheet 9) show our improved cam-shoe or cam follower;

Fig. 32 (Sheet 10) is a right sectional elevation of the adjustable lift rod and mechanism connected therewith, which transmits the motion from the cam to the emery wheel whereby the latter is moved over the periphery of the saw-tooth; Fig. 33 is a front elevation of the same;

Fig. 34 is a plan view of the lower part of Fig. 32;

Fig. 35 is a sectional detail taken on the line 35—35 of Fig. 32;

Fig. 36 is a sectional detail taken on the line 36—36 of Fig. 32;

Fig. 37 is a plan section taken on the line 37—37 of Fig. 36;

Figs. 38 and 39 are details of our improved spring-expansion collar;

Figs. 40, 41, 42, 43, 44, 45 and 46 (Sheet 3) are details of construction of my cam-controlling lever, showing how the same is designed to resist any play therein; and Fig. 47 diagrammatically illustrates the housing in which the whole of our machine is enclosed.

The frame, 1, of our machine is constructed so as to encase and keep free from dust the interior mechanism. 2 represents a saw positioned for sharpening. Supporting the saw 2 are a plurality of back-rests 3, vertically movable on fixed vertical guide bars 4 and adapted to be adjusted simultaneously thru the medium of a screw 5, beveled gears 6, 7, shaft 8, and crank handle 9. The adjustment of the back-rests is made so as to accommodate the width of the saw 2, so that the bottom of the throats of the teeth 11 will lie just enough above the top of the frame to allow clearance for the emery wheel in its grinding action.

To provide for successive sharpening of the teeth 11 the saw 2 is given a progressive, horizontal, step-by-step motion, which is imparted by the saw-feeding finger 12 (Figs. 5 to 8 and 18); said finger being carried by an arm 13 pivoted on the carriage 14, the latter sliding in fixed boxes 15 and operating as hereinafter described. Said boxes 15 are cast on the frame 1, in such a position that the parallel bars 16 of the carriage 14 will travel slightly downward in their forward motion and also slightly away from the saw 2 (Figs. 17 and 18). The feed-finger 12 will thereby drop a fraction of an inch in the saw-tooth during the forward stroke of the feed-finger, thus eliminating any tendency it may have to raise the saw during its forward stroke, especially when the bars 16 become worn. At the same time said feed-finger will draw in on the saw and hold it against the guide piece 17. (Figs. 3, 21, 22.)

The carriage 14 is actuated thru the medium of the link 18, rocker arm 19, and cam follower 20 mounted thereon; the latter is adapted to operate on any one of the cams 21. The proper one of the cams 21 to be selected is that which will operate the feed finger to accommodate the shape of the saw teeth 11 desired to be operated. The cam follower 20 is preferably a fixed shoe, thereby insuring a firm contact with the cam. We have invented a type of cam shoe or follower, as shown in Fig. 30, providing the same with a circular periphery and a plurality of bolt holes 20' so that when said cam shoe has become worn it may be set in a new position on the rocker arm 19 and a new face set in contact with the cam. The cams 21 are fixed on the shaft 23 and are kept in constant rotation thru mechanism comprising gears 24, 25, shaft 26, bevel gears, 27, 28, shaft 29, and the pulley 30, the latter being driven by a belt hereinafter described.

Referring to Figs. 5 and 18, the carriage 14 contains an adjustable cross head 31, the latter provided with boxes 32 to permit its moving along on the horizontal bars 16 of the carriage 14. The cross head 31 is provided with an arm 32', thus giving the latter member a three-point bearing on the bars 16. The adjustment of the cross head 31 is made by the screw 33, which is threaded in the body of the carriage 14 and provided with a fixed collar 34 adapted to bear against the flange of the cross head 31. The screw 33 is tubular and thru it passes a jam screw 35 which is threaded on its inner end into the yoke 36. On the yoke 36 are mounted studs 37 which pass thru holes provided therefor in the carriage 14. Said studs are adapted to be brought tightly against the cross head 31, thereby locking the latter firmly in its position with the carriage 14. This adjustment is regulated until the feed-finger 12 brings the saw tooth to the position desired under the emery wheel.

The cam shoe 20 is held against the cam 21 by means of the tension of the spring 38, which acts on the carriage 14 thru the medium of the rocker arm 39 fast on the rock-shaft 39', arm 39'', and the link 41. It will be noted that the two links 18, 41 are always in compression. The thrusts in these two links will constitute two forces acting as a couple on the carriage 14 and tending to cause the latter to rotate counter-clockwise. (See Figs. 5, 17, 18.) This tendency of the carriage to rotate will occur in a horizontal as well as a vertical plane. The carriage 14 will thus bear in the boxes 15 in a constant position, with the avoidance of any tendency of the same to jump around in said boxes in response to the ordinary backward and forward thrusts exerted thereon. The backward pressure of the saw against the feed finger 12 will act in co-operation with this couple.

A screw rod 42, provided with a milled head 43, and adapted for fine adjustment, serves as a positive stop of the forward movement of the feed finger 12, so that the tooth of the saw 2 will be in exact position for receiving the emery wheel, regardless of the flexibility of the feed finger mechanism. The adjustable stop 42 is placed within the enclosed frame, 1, of the machine, thereby keeping its inner end free from dust and dirt, which would destroy the advantage of its fine adjustment. The adjustable stop 42 is secured in adjustment by the locking screws 43'.

The carriage 14 is also provided with vertical webs 52 spaced a substantial distance apart, and between said webs the arm 13 is hinged. In order to steady the arm 13 against lateral displacement its hinge-end 13ᵃ is made wide, as shown in Fig. 6, and it is hinged in place by opposed cone bearings or screws 44, which are locked by lock nuts 46.

To regulate the vertical position of the arm 13 and therewith the feed-finger 12, so that the latter will engage the saw teeth just below the point thereof, as shown in Fig. 9, we provide a movable plate 47. The latter is adjusted and secured in place by the thumb-screw 48, located in one end of the plate 47, and adapted to engage with any one of the notches 49 of an arm 14ª of the carriage. The plate 47 is made with a perpendicular stiffening web 47ª. The vertical side webs 52 of the carriage 14 are connected by a transverse web 14ᵇ having a T-shape slot 14ᶜ, thru which the plate 47 extends; the latter being T shape in cross section. At the bottom of the inner faces of the webs 52 are provided lateral supporting flanges 51 on which bears the front or right-hand end of the plate 47. By turning the set-screws 48 down on the arm 14ª, of the carriage, the plate 47 will be lifted against the shoulders of the slot 14ᶜ, and the front end of the plate 47 will be firmly seated on the supporting flanges 51, in this way rigidly holding the plate 47 in place. As will be noted, the arm 13 is of U-shape. The front, or right-hand end, of the plate 47 is provided with three set-screws 53, by which the lowest position of the feed-finger 12 will be determined; the plate 47 being movable longitudinally so as to bring any desired one of the set-screws 53 into proper position, thereby adapting these devices to accommodate saw-teeth of different depths.

The machine frame, 1, extends well under the arm 13 which supports the feed-finger. Said frame 1 is provided with a removable box-shaped hood 54 over the feed-finger mechanism; the latter is thus well enclosed and all parts of the mechanism are thereby kept clean and the adjustments intact.

The emery wheel 56 (Figs. 1, 2, 3, 5) is mounted on the shaft 57, which in turn is supported by the wheel frame 114, which is supported by a face-plate 113, which in turn is supported by the rocker arms 58, similar to the rocker frame described in the Patent No. 1,227,556, issued to Edward P. Armstrong May 22, 1917. A bracket 59, which supports the arms 58, is adjustably secured to the frame, 1, by the set-screws 60, 61, 62; the screws 61 passing thru slots 63 provided in the bracket 59; and the screws 60 are threaded in the bracket 59 and bear on the top of the machine frame 1. Said wheel 56 is driven thru the medium of the belt 64, pulley 66, shaft 67 and pulley 68, the latter being connected by a belt to any source of power. The pulley 69 is the ordinary loose pulley. The pulley 71, mounted also on the shaft 67, is connected by a belt (not shown) to pulley 30, thus driving the feed finger mechanism and giving to the latter a co-operative movement with the action of the emery wheel. The idler pulley 72, thru the tension of the spring 73 (Fig. 3) serves as a tightener for the belt 64. These devices also serve as a take-up for any slack in the belt caused by shifting pulley 66 endwise (see Fig. 3) for causing the belt to engage the smaller step of the pulley 66, bringing the pulley 72 tighter and approximately in the position shown in dotted outline in Fig. 3.

Said emery wheel 56 is given a reciprocating vertical motion to ride over the back of the tooth 11 and grind the latter uniformly, said reciprocating motion being imparted by one of the cams 74, which are mounted on the shaft 23. The cam-operated rocker frame 76, adapted to rock on the shaft 77, is provided at its free end with the cam shoe 78, similar to the shoe 20. A transverse arm 79, of the rocker frame 76, connects with and reciprocates a lift rod 80 (Figs. 1, 3, 32, 33, 35, 36) the latter being connected to the face plate 113 which carries the emery wheel frame 114. An opening 81 is provided in the front of the machine frame 1, for the extension of the arm 79. A plate 81ª, bolted to the lift rod 80, and therefore moving with the latter, encloses said opening in the machine frame 1, thereby preventing dust from getting into the interior of the machine. The lower end of the lift rod 80 is pivoted to the arm 79 by means of the pin 82, which is secured in the arm 79 by a set screw 83. To prevent any undue play in the pivot connection of the arm 79 and the lift rod 80, we provide an improved expansion collar which comprises a fixed collar 84, held on the pin 82 by a set-screw 86, and a slidable collar 87, the latter being held against rotation by the pins 88. Helical springs, 89, cause the slidable collar 87 to bear tightly against the shoulder of the lift rod 80.

A similar spring expansion connection is used to prevent play between the upper end of the lift rod 80 and the emery wheel frame 114. In this upper connection, however, we provide a means for regulating the desired degree of the bearing of the emery wheel on the saw teeth 11, such adjustment means comprising a handle 90, a shaft 91, bevel gears 92, and a vertical screw rod 93, the latter extending downward and forming part of the lift rod 80. The upper end of said rod 93 is inserted thru a split collar 94, the latter locking the screw rod 93 against rotation by the tightening of the finger screw 95. This adjustment mechanism is enclosed in a housing 96.

As a means for limiting the downward stroke of the emery wheel 56, when it is desired not to cut the throat of the teeth 11 any deeper, we provide a vertical rod 97 (Fig. 1) which extends upward thru an eye hole 98 provided in the cam operated rocker frame 76. Said rod has an adjustable stop 99 at its lower end and a horizontal pin 100 fixed in its upper end, the latter being adapted to slide in the inclined slot 101 provided therefor in a bracket 102 on the machine frame 1. An adjustment rod 103, bearing at its outer end a finger screw 104, engages the pin 101, and by turning said finger screw 104 the rod 97 may be raised or lowered to bring the stop 99 in the desired vertical position. Since every part of this stop mechanism is in tension, the resiliency thereof will be limited to a negligible amount.

By manipulation of the hand lever 106 (Fig. 3) which operates to move the cam-controlling lever 107 (see Figs. 3, 4, 5) horizontally, the desired one of the series of cams 21 and of the corresponding series of cams 74 may be brought into play. The lever 107 is locked into position by the free end thereof meshing with one of the notches 108 of the fixed plate 109 and being held therein by the spring 110. The other end of the cam-controlling lever 107 is pivotally supported by a plate 111 bolted on the machine frame 1. A spring 111' holds the lever 107 in said notched plate against play. Another hand lever 112 engages the cam rocker frame 76 and provides a means for throwing the cam shoe 78 into or out of contact with the cam 74 and incidentally raising or lowering the emery wheel 56. For rendering the emery wheel 56 adjustable to the desired inclined position with respect to the saw teeth 11, the wheel frame 114 is supported by arms 58, which have a rocking bearing on the plate 58' which is adjustable on the slotted plate 59, and is secured in the position to which adjusted by bolts 117. A pulley 118 serves to change the lead of the emery wheel driving belt 64 to accommodate the latter in its inclined position, said pulley 118 being adjustable by the finger screw 119.

A gate 121 (Figs. 1, 2, 3,) is pivotally supported on the machine frame by the adjustable cone-shaped screws 122. Said gate is faced with a block 123 adapted to bear against the saw 2 and act in co-operation with the guide 17, the latter being adjustable on the machine frame, 1, by screws 125, 126, 127 and 128. The saw is thus clamped in place with the prevention of any springing or buckling of the same. Said gate 121 is held in position by the spring arm 129, pivoted to the machine frame by a bolt 131. The latter holds the spring arm 129 rigidly against the arc-shaped rails 132, 133, the latter being cam-shaped and located on the gate 121. Said arm 129 can be drawn against the rails 132, 133 by tightening the bolt 131. Adjustable screws 134 in the gate serve as additional lateral supports for the saw and are adjusted to accommodate the wear in the block 123.

To eliminate any end-play in the various shafts we provide spring expansion collars 136 (Fig. 4) similar to the collar described in connection with the lift rod 81. The spring expansion collar on the shaft 23 has an auxiliary feature a sleeve 137 and a washer 138, both being so shaped as to bear snugly against and lock with the cam-controlling lever 107.

The structure of the back rest directly underneath the emery wheel is shown in Figs. 19 to 22. Since this back rest is subject to serve wear because of emery dust being constantly deposited thereon, we construct the same of a plurality of pieces 141, 142, 143, comprising a main block 139 and the three demountable pieces, of which 142 is the saw rest and 143 constitutes a flange for retaining the saw in place. The latter are held together by the screws 144. A screw 146 holds the latter pieces to the block 139. The center piece 142 of said back rest can thus be removed and refaced to eradicate any groove worn therein by the saw sliding over the same.

An auxiliary feed finger 147 at the rear of the machine (Figs. 10, 12, 13, 14) is operated thru the medium of a horizontal arm 148, rocker-arms 149, 151, link 152, and crank arm 152', the latter being actuated by the shaft 153, which shaft rocks with the rocker arm 19 at the front of the machine. A gate 154 for laterally supporting the saw under this auxiliary feed finger is shown in Figs. 10, 12 to 16. Said gate 154 is hinged on the horizontal shaft 155, mounted in standards 156, 157. A second shaft 158, journaled in the same standards, is rotatable by the handles 159, and said shaft 158 contains segmental notches 161. On the shaft 155 are provided arms 155'. Set screws 163 are adapted to bear on the shaft 158 and lock the gate 154 in its closed position. The handles 159 are so arranged that when they are raised to a horizontal position the screws 163 will pass thru the notches 161 and allow the gate to be lowered and the saw removed.

The stationary guide 166 serves as a counter support for the saw 2. A bolt 167 inserted in the frame of the gate 154 limits the position to which the latter may be lowered due to the bolt striking against the standard of the stationary guide 166.

The construction of our improved cams is shown in Figs. 23 to 28 inclusive. Referring first to Figs. 27, 28: On the shaft 23 is keyed a hub 171 adapted to receive cams 21, said hub being provided at one end with a radially extending integral flange 172. On the inner face of the flange 172 is a block 172$^a$, the latter bearing screws 173. A plurality of cams are placed over the hub and locked to the block 172$^a$ by said screws 173. When the throw of the cam will not permit its being placed over the hub, a cam of different form, and in two pieces, may be affixed to the face of the flange 172 by screws 174. Bolts 176, extending thru the series of cams, bind the whole firmly together. Split cams, as shown, are desirable to facilitate removal from the shaft 23, the two sectors of the cams being held together by bolts 177.

In order that the cams 74 can be adjusted on the shaft 23, so that their operation will correspond to that of the cams 21, we provide adjustable means for mounting said cams 74 to the shaft 23. (Figs. 23, 24, 25, 26.) On the shaft 23 is keyed a hub 178, provided with a radially extending flange 179. A plurality of cams are secured to said hub independently of one another by the bolts 181, 182, 183, 184, thus permitting the first cam to be adjusted and secured in place and then followed by the next until they are secured, without disturbing the adjusting of one when the next is secured. The arc-shaped slots 186, 187, 188 in the cams permit the adjustment of the same on the hub, and the series of holes 188' and 188'' in conjunction with the slots 186, 187 make possible a greater range of adjustment of the cams 74. Said cams 74 are made in two pieces, the smaller piece 189 being made with a flanged lip for overlapping the main portion of said cam and being fastened to the same by the bolts 191. This permits the removal of the cam from the shaft 23. A removable plate 192 (Fig. 5) in the machine frame, 1, allows access from the exterior of the machine to the cams and other internal parts. A similar removable plate 193 is provided at the other side of the machine, and an L-shaped plate 194 is removably secured in the back of the offset in the top of the machine frame 1, to allow access to the upper interior parts.

In Figure 7 we show diagrammatically the parts by which the adjustment is effected which projects thru the walls of the housing, so that the adjustment may be effected from the exterior of our machine. The doors 193, 194 are arranged to give access to the enclosed parts which may require attention.

I claim:

1. In a saw-sharpening machine, a grinding wheel, a plurality of vertically movable saw back-rests, one thereof located under the grinding wheel the others spaced therefrom, and means for simultaneously positioning said back-rests in unison with each other.

2. In a saw-sharpening machine, a grinding wheel, a plurality of vertically movable saw back-rests, one thereof located under the grinding wheel the others spaced therefrom, one of said back-rests having a demountable saw-supporting piece, and means for simultaneously positioning said back-rests in unison with each other.

3. In a saw-sharpening machine, a grinding wheel, a plurality of vertically movable saw back-rests, one thereof located under the grinding wheel the others spaced therefrom, guiding means restraining said back-rests to vertical alinement, and means for simultaneously positioning said back-rests in unison with each other.

4. In a saw-sharpening machine, a grinding wheel, a plurality of vertically movable saw back-rests, one thereof located under the grinding wheel and the others spaced therefrom, guiding means restraining said back-rests to vertical alinement, one of said back-rests having a demountable saw-supporting piece, and means for simultaneously positioning said back-rests in unison with each other.

5. In a saw-sharpening machine, a horizontally reciprocable carriage having parallel members sliding in boxes provided on the frame, an arm pivoted on said carriage, a saw-engaging finger carried by said arm, a driven shaft, a cam element on said shaft, a rocker-arm engaging with said cam element, a cross-head movably mounted on the parallel members of said carriage, a link connecting the rocker-arm with said cross-head, and an adjustable connection between the cross-head and the carriage.

6. In a saw-sharpening machine, a horizontally reciprocable carriage having parallel members sliding in boxes provided on the frame, an arm pivoted on said carriage, a saw-engaging finger carried by said arm, a driven shaft, a cam element on said shaft, a rocker-arm, a cross-head movably mounted on the parallel members of said carriage, said cross-head including an arm whereby the cross-head has a three-point bearing on said parallel members, a link connecting the rocker-arm with said cross-head, and an adjustable connection between the cross-head and the carriage.

7. In a saw-sharpening machine, a horizontally reciprocable carriage, an arm pivoted on said carriage, a saw engaging finger carried by the carriage, and means on the carriage for supporting said arm in vertically variable positions.

8. In a saw-sharpening machine, a horizontally reciprocable carriage, a saw engaging arm, cone screws pivotally supporting the arm on the carriage, and lock-nuts on said screws.

9. In a saw-sharpening machine, a horizontally reciprocable carriage, a saw engaging arm, cone screws pivotally supporting the arm on the carriage, lock-nuts on said screws, and supplemental means for supporting said arm in vertically variable positions on the carriage.

10. In a saw-sharpening machine, a horizontally reciprocable carriage, an arm pivoted on said carriage, a saw-engaging finger carried by said arm, a driven shaft, a cam element on said shaft, a rocker-arm provided with a rigidly held adjustable shoe engaging with said cam element, and a connection between the rocker-arm and the carriage.

11. In a saw-sharpening machine, a horizontally reciprocable carriage, an arm pivoted on said carriage, a saw-engaging finger carried by said arm, a driven shaft, a cam element on said shaft, a rocker-arm engaging with said cam element, a connection between the rocker-arm and the carriage, and means for holding the rocker-arm constantly on the cam element.

12. In a saw-sharpening machine, a horizontally reciprocable carriage, an arm pivoted on said carriage, a saw-engaging finger carried by said arm, a driven shaft, a cam element on said shaft, a rocker-arm engaging with said cam element, a connection between the rocker-arm and the carriage, and means for holding the rocker-arm constantly but yieldingly on the cam element.

13. In a saw-sharpening machine, a horizontally reciprocable carriage, an arm pivoted on said carriage, a saw-engaging finger carried by said arm, a driven shaft, a cam element on said shaft, a rocker-arm engaging with said cam element, a connection between the rocker-arm and the carriage, a bell-crank, a spring pulling one arm thereof, and a link connecting the opposite end of the bell-crank with said carriage.

14. In a saw-sharpening machine, a horizontally reciprocable carriage, an arm pivoted on said carriage, a saw-engaging finger carried by said arm, a driven shaft, a cam element on said shaft, a rocker-arm engaging with said cam element, a connection between the rocker arm and the carriage, means for holding the rocker-arm constantly on the cam element, and said motion-transmitting means being adapted to cause a constant thrust on the articulations of said motion-transmitting connections.

15. In a saw-sharpening machine, a horizontally reciprocable carriage, an arm pivoted on said carriage, a saw-engaging finger carried by said arm, a driven shaft, a cam element on said shaft, a rocker-arm engaging with said cam element, a connection between the rocker-arm and the carriage, means for holding the rocker-arm constantly but yieldingly on the cam element, and said motion-transmitting means being adapted to exert a force coupled on the carriage thereby causing it to have a constant bearing against the same faces of its guiding elements.

16. In a saw-sharpening machine, a horizontally reciprocable carriage, an arm pivoted on said carriage, a saw-engaging finger carried by said arm, a driven shaft, a rocker-arm engaging with said cam element, a connection between the rocker arm and the carriage, means for holding the rocker-arm constantly but yieldingly on the cam element, said motion-transmitting means being adapted to cause a constant thrust on the articulations of said motion transmitting connections, and said motion-transmitting means being further adapted to exert a force couple on the carriage thereby causing it to have a constant bearing against the same faces of its guiding elements.

17. A machine as specified in claim 12 in which an adjustable stop is provided for limiting the forward travel of the carriage.

18. In a saw-sharpening machine, a frame, a back-rest for the saw, a horizontally reciprocable carriage having parallel members sliding in boxes provided on the frame, an arm pivoted on the carriage, and said boxes being set out of alinement with both the horizontal and the vertical planes of motion of the saw, for the purposes set forth.

19. In a saw-sharpening machine, a reciprocable carriage, an arm pivoted on the latter, said arm consisting of an upper and a lower member, the upper member adapted to engage the saw, a housing element interposed between said members for covering the bearings of said carriage, and said upper member of the arm being spaced above said housing element.

20. In a saw-sharpening machine, a reciprocable carriage, an arm pivoted on the latter, said arm consisting of an upper and a lower member, the upper member engaging the saw, a housing element interposed between said members for covering the bearings of said carriage, said upper member of the arm being spaced above said housing element, and a hood partially enclosing said upper member.

21. In a saw sharpening machine, in combination with the frame, a grinding wheel, a guide piece located under the grinding wheel, adjustably supported by the frame wall located on one side of the saw, and constituting a bearing for the latter.

22. In a saw-sharpening machine, in combination with a grinding wheel and the back-rest for the saw under the grinding wheel, a gate hinged on a horizontal axis for clamping the saw in place, said gate being adapted to bear at its longitudinal middle on the saw and provided at its lateral extremities with adjustable members adapted to bear on the saw, and means for securing the gate in its saw-holding position.

23. In a saw-sharpening machine, in combination with a grinding wheel and the back-rest for the saw under the grinding wheel, a gate hinged on a horizontal axis for clamping the saw in place, said gate being adapted to bear at its longitudinal middle on the saw and provided at its lateral extremities with adjustable members adapted to bear on the saw, and a rotatable spring-arm for securing the gate in its saw-holding position and a curved cam-member for the extremity of the arm to ride on.

24. In a saw-sharpening machine, in combination with a grinding wheel and the back-rest for the saw under the grinding wheel, a gate hinged on a horizontal axis for clamping the saw in place, said gate having a renewable bearing block at its longitudinal middle and provided at its lateral extremities with adjustable members adapted to bear on the saw, and means for securing the gate in its saw-holding position.

25. In a saw-sharpening machine, a vertically movable frame, a grinding wheel journaled therein, a driven shaft, a cam element on the shaft, a pivoted arm bearing on the cam element, a motion transmitting means connecting said arm with said frame, and means for limiting the descending movement of said wheel-carrying frame.

26. In a saw-sharpening machine, a vertically movable frame, a grinding wheel journaled therein, a driven shaft, a cam element on the shaft, a pivoted arm bearing on the cam element, motion-transmitting means connecting said arm with said frame, and adjustable means for limiting the descending movement of said wheel-carrying frame.

27. In a saw sharpening machine, a vertically movable frame, a grinding wheel journaled therein, a driven shaft, a cam element on the shaft, a pivoted arm bearing on the cam element, motion-transmitting means connecting said arm with said frame, a vertically adjustable stop controlling the downward movement of said pivoted arm in following the cam, and means for adjusting said stop from the exterior of the machine.

28. In a saw sharpening machine, a vertically movable frame, a grinding wheel journaled therein, a driven shaft, a cam element on the shaft, a pivoted arm bearing on the cam element, motion-transmitting means connecting said arm with said frame, a pendent rod slidably connected with said pivoted arm, the upper end of the rod being supported by a pin bearing in an inclined slot, a stop on the lower end of said rod, and means operable from the exterior of the machine for positioning said pin in said slot.

29. In a saw sharpening machine, a driven shaft, two series of connected, shiftable cams carried by the shaft, saw-advancing means actuated by one series of cams, a grinding wheel element, means, actuated by the other series of cams, for applying the grinding wheel to the saw in synchronism with the action of the saw-advancing means, and means for shifting the cams.

30. In a saw sharpening machine, a driven shaft, two series of shiftable cams carried by the shaft, saw-advancing means actuated by one series of cams, a grinding wheel element, means, actuated by the other series of cams, for applying the grinding wheel to the saw in synchronism with the action of the saw-advancing means, a laterally movable lever-arm operating to shift said cams, means for operating the lever-arm, and means for locking the latter in place.

31. In a saw sharpening machine, in combination with a vertically movable grinding wheel element, means for guiding the grinding wheel relatively to the desired shape of the saw teeth, said grinding wheel guiding means including a connecting rod variable in length, and means for varying the length of the rod.

32. In a saw sharpening machine, in combination with a vertically movable grinding wheel element, means for guiding the grinding wheel relatively to the desired shape of the saw teeth, said grinding wheel guiding means including a connecting rod variable in length, means for varying the length of the rod, and means for locking the latter means.

33. In a saw sharpening machine, in combination with a vertically movable grinding wheel element, means for guiding the grinding wheel relatively to the desired shape of the saw teeth, said grinding wheel guiding means including a rod consisting of two members threaded one in the other, and means for rotating one of said rod members.

34. In a saw sharpening machine, in combination with a vertically movable grinding wheel element, means for guiding the grinding wheel relatively to the desired shape of the saw teeth, said grinding wheel guiding means including a rod consisting of two members threaded one in the other, means for rotating one of said rod members, and means for locking the rod members against rotation.

35. In a grinding machine, a vertically movable grinding wheel, means for guiding the latter in its work, such means including an oscillating arm, a housing provided with an opening thru which the extremity of said arm projects, and a sliding plate, carried by the arm, covering said opening.

36. In a grinding machine, a vertically movable grinding wheel, a rotating cam, motion transmitting connections giving the wheel a vertical movement relative to the desired shape of the saw-teeth, and means for lifting and holding said connections off said cam.

37. In a saw sharpening machine having a grinding wheel mounted for angular adjustment, and a belt-and-pulley drive for the wheel including a guide pulley mounted for angular adjustment relative to that of the wheel.

38. In a saw sharpening machine, a grinding wheel, a bracket mounted on the frame of the machine and having supporting means for the grinding wheel, the mounting of the bracket being adapted to permit the horizontal and vertical adjustment thereof, and including means for securing the bracket in place.

39. In a saw sharpening machine, a grinding wheel, a bracket mounted on the frame of the machine and having supporting means for the grinding wheel, the wheel-supporting means being adapted for angular adjustment, the mounting of the bracket being adapted to permit the horizontal and vertical adjustment thereof and including means for securing the bracket in place, and a belt-and-pulley drive for the grinding wheel including a guide pulley mounted on said bracket and adapted for angular adjustment relative to that of said wheel.

40. In a saw sharpening machine, saw-advancing means comprising a driven shaft, a counter shaft, a cam mounted thereon, a rocker-arm bearing on the cam, a reciprocating device including a saw-feed finger located at the front of the machine and connected with said rocker-arm, a crank-arm on the counter shaft, a vertically oscillatable arm located at the rear of the machine and having a feed finger pivoted thereon, and an operative connection between the oscillatable arm and said crank arm.

41. In a saw sharpening machine, a saw rest comprising a fixed upright member and a companion member or gate hinged on a horizontal axis, a shaft journaled parallel with the hinge axis, such shaft provided with a segmental notch, said gate provided with an arm having a set-screw bearing on the notched part of said shaft, and the latter being provided with a crank handle for rotation, thereby opening and closing the gate.

42. In a saw sharpening machine, saw advancing means, saw-teeth grinding devices, means for actuating said advancing means and said grinding devices in variable relative unison, and means for adjusting said actuating means and thereby the action of said grinding devices as desired.

43. In a saw sharpening machine, saw advancing means, saw-teeth grinding devices, means for actuating said advancing means and said grinding devices in variable relative unison, and means, including an operating lever, for adjusting said actuating means and thereby the action of said grinding devices as desired, said lever having a spring bearing to prevent lost motion in the movement of the lever.

44. In a saw sharpening machine, a horizontally reciprocal carriage, an arm hinged on the carriage, a saw-engaging finger carried by said arm, the carriage being provided with spaced members constituting a support for the free end of said arm, the latter having a wide hinge end, and the arm hinging means consisting of two opposed cone bearings.

45. In a saw sharpening machine, a horizontally reciprocal carriage, an arm hinged on the carriage, a saw-engaging finger carried by said arm, the carriage being provided with spaced members constituting a support for the free end of said arm, the latter having a wide hinge end, and the arm hinging means consisting of two opposed cone-screws threaded into the sides of said supporting members.

46. In a saw sharpening machine, a horizontally reciprocal carriage, an arm hinged on the carriage, a saw-engaging finger carried by said arm, the carriage being provided with spaced members constituting a support for the free end of said arm, the latter having a wide hinge end, the arm hinging means consisting of two opposed cone bearings, and a stop on said carriage for limiting the drop of said arm.

47. In a saw sharpening machine, a horizontally reciprocable carriage, an arm hinged on the latter, said arm having means to engage a saw, a plate longitudinally adjustable on said carriage, means for securing said plate in place, and a series of stops provided on said plate for limiting the drop of said arm.

48. In a saw sharpening machine, the combination of a reciprocating member, a U-shaped saw-advancing arm hinged on the carriage with its members lying in horizontal plane, a housing element extending over the lower member of said arm, and a stop for limiting the forward travel of the carriage, such stop located under said housing element.

49. In a saw sharpening machine, the combination of a reciprocating member, a U-shaped saw-advancing arm hinged on the carriage with its members lying in horizontal plane, a housing element extending over the lower member of said arm, an adjustable stop for limiting the forward travel of the carriage, such stop located under said housing element and projecting beyond the side wall of the housing.

50. The combination of a motion transmitting element comprising a piece having a pivot pin and another piece pivoted on such pin, the extremity of the latter projecting beyond the piece pivoted thereon, and a resilient collar mounted on said pin extremity for yieldingly but firmly holding the pivoted piece against longitudinal movement on the pivot pin.

51. The combination of a motion transmitting element comprising a piece having a pivot pin and another piece pivoted on such pin, the extremity of the latter projecting beyond the piece pivoted thereon, and a collar comprising a member fixed in place on said pin, a companion movable member, and a spring element seated between said collar members.

52. In a saw sharpening machine, two series of related stepped cams, saw advancing means actuated by one of said series of cams, a grinding wheel element, means actuated by the other series of cams for applying the grinding wheel to the saw in synchronism with the action of the saw advancing means, and means for varying the motion transmitting relation of said cams.

EDWARD P. ARMSTRONG.
   HENRY W. ARMSTRONG.